United States Patent Office

2,918,400
Patented Dec. 22, 1959

2,918,400

SANITIZING COMPOSITIONS

Alfred C. Loonam, New York, N.Y., assignor to Chilean Nitrate Sales Corporation, New York, N.Y., a corporation of New York No Drawing. Application April 16, 1956
Serial No. 578,189

13 Claims. (Cl. 167—17)

This invention relates to new compositions of matter. More particularly, the invention contemplates the provision of new and improved sanitizing compositions of the type containing available iodine as the sanitizing agent in an inactive or relatively stable form but capable of being released upon contact or admixture of the compositions with water in the preparation of sanitizing solutions.

Compositions containing iodine or capable of producing iodine upon admixture with a suitable solvent are highly useful in the preparation of liquid germicidal compositions for use as antiseptics and for applications in sanitizing food-handling utensils and similar equipment. For solid formations of the general class described, it is known that the system comprising a mixture of an alkali iodide, an alkali iodate, and a solid acid in the relative proportions capable of releasing free iodine in accordance with the reaction

$$5NaI + NaIO_3 + 6NaHSO_4 \rightarrow 3I_2 + 6Na_2SO_4 + 3H_2O$$

shows promise, provided a bisulfate, an acid phosphate or even sulfamic acid be employed as the acid component, since such a system is preferably safe to ship and store under normal conditions. For reasons of economy and efficiency of operation, however, it is highly desirable to employ as the acid component of such a system, an organic acid such as citric acid in conjunction with other organic substances such as ethylenediaminetetracetic acid, for its chelating action, wetting agents, detergents, corrosion inhibitors, tableting agents or binders, and similar additives of an organic nature. Such mixtures, containing both iodate with large quantities of reactive oxygen, and organic matter, are inherently dangerous to prepare, handle and store since they are combustible and possibly even explosive.

The unique compositions of the present invention are intended to insure reasonable and safe stability within a system of the foregoing type while retaining the desirable iodate content of the system. Specifically, the invention contemplates stabilizing of the iodate constituent to reduce its activity and concentration such that it offers little or no tendency to react violently with organic substances or other combustible materials which one may desire to incorporate in formulations of the general class described to confer special properties on the mixture or their resulting solutions, such, for example, as compatible organic substances of the types of acids, wetting agents, detergents, tableting agents or binders, corrosion inhibitors, chelating agents, etc. I accomplish this in accordance with the present invention by employing the iodate constituent as one component of a double salt or complex, the other component of which is poor in available oxygen as compared with the iodate, or entirely oxygen-free. Thus, I am able to reduce the effective thermodynamic activity of the iodate with reduction in the relative concentration of available oxygen.

As double salts, I may employ salts of sodium iodate and sodium sulfate, such, for example, as $NaIO_3.4Na_2SO_4$ and $NaIO_3.3Na_2SO_4$ (Am. J. Sc., 19, 203–213, 1930), or, I may employ mixtures of these two salts, this being particularly advantageous because of the relative ease of preparation of such mixtures as compared with the preparation of the individual complexes. Alternatively, I may employ double salts of sodium iodate and sodium iodide, such as $2NaIO_3.3NaI.xH_2O$ (J. Am. Chem. Soc. 56, 295–299, 1934), where x is less than 10, i.e., preferably the double salt of lowest possible water content since it will have the smallest vapor pressure of this substance.

Of the double salts specified, I find that the sodium iodate-sodium sulfate double salts are superior in that they are anhydrous. In this connection, it should be explained that the iodide-iodate-acidifying agent compositions of the present invention are sensitive to moisture and even relatively small proportions of water tend to promote undesirable production of free iodine upon storage. For this reason, I prefer to employ a sodium iodate-sodium sulfate double salt, or mixtures of these salts within the santiizing compositions of the invention. Furthermore, the mixed double salts, $NaIO_3.4Na_2SO_4$ and $NaIO_3.3Na_2SO_4$, contain only 6.25% and 7.7% available oxygen, respectively, as compared with 24.2% for the pure iodate, $NaIO_3$.

As the acidifying agent, I may employ any acidic compound capable of reacting in accordance with the equation set forth hereinbefore, and preferably, an acid which will not react with iodine in solution rapidly enough to impair its bactericidal action. I may also employ compounds such as acid anhydrides, provided they rehydrate to the acids rapidly in solution, and substances such as aluminum sulfate and aluminum acetate, which, although normal salts, hydrolyze in solutions to yield acids which are effective in promoting the iodide-iodate reaction, or, I may employ acid phosphates, sodium bisulfate or glutamic acid. In actual practice, however, I prefer to employ critric acid as the acidifying acid because of its availability and low cost. Of course, the invention resides in the discovery of means which render it safe to employ iodate in formulations containing organic constituents, and, as such, is actually independent of the specific kind of acid employed as the acidifying agent.

The iodide and iodate constituents of the compositions of the invention may be employed in stoichiometric quantities or any different proportion depending upon the use to which the formulations are to be put. For example, provided the iodine concentration of the resulting solution is to be less than that corresponding to saturation under normal conditions of use (162 p.p.m. at ° C. and 340 p.p.m. at 25° C.), the iodide and iodate should be employed in the stoichiometric ratio or with an excess of the iodate. In fact, this is very much to be desired in solutions to be used for sanitizing purposes, as any excess iodide tends to form triiodide ion, $I_3^-$, which has been shown to have much less bactericidal action than free diatomic iodine, $I_2$. An excess of iodate, however, would tend to prevent loss of free iodine by reduction to iodide during use of the solution. On the other hand, if, for example, the composition was desired to provide a two percent iodine solution to replace the conventional liquid tincture or the N.F.-type solutions, then an excess of iodide would be needed to keep the iodine in solution. Further, if the resulting solution was to be used immediately and thereafter discarded, a ratio of residual iodide ion to free iodine of approximately 1 would be satisfactory, whereas if the solution was to be stored for some period under varying conditions of temperature, the ratio should be increased to about 1.5.

The following examples are illustrative of typical sanitizing compositions embodying the principles of my invention:

Example I

The following mixture, which can be prepared either in powder form or as tablets and packed in a moisture-proof container, when added to 2.5 gallons of water, yielded a solution containing approximately 50 parts per million free iodine at a pH of approximately 3.0. The resulting solution is particularly well adapted to the sanitization of dishes and other food-handling utensils.

| | Grams |
|---|---|
| Sodium iodide (anhydrous) | 0.466 |
| $NaIO_3 \cdot xNa_2SO_4$ (12.66% I) (or 0.477 gram $NaIO_3 \cdot 4Na_2SO_4$) | 0.623 |
| Citric acid (anhydrous) | 5.402 |

Example II

The mixture prepared in Example I was modified by the addition of 1.419 grams of sodium laurylsulfate to promote smooth runoff of the resulting sanitizing solution upon draining. The resulting mixture was found to be totally stable.

Example III

The following mixture, also prepared in either powder or tablet form, when added to 2 fluid ounces of water yielded a solution ideally suited for antiseptic uses, containing 2% free iodine and 2.4% NaI, i.e., equivalent concentrations as contained within Iodine Solution N.F.:

| | Grams |
|---|---|
| Sodium iodide (anhydrous) | 2.815 |
| $NaIO_3 \cdot xNa_2SO_4$ (12.66% I) (or 1.297 grams $NaIO_3 \cdot 4Na_2SO_4$) | 1.694 |
| Citric acid (anhydrous) | 0.680 |

Example IV

The following formulations, containing in combination: (1) an organic acid to supply the hydrogen ion necessary for the iodide-iodate reaction and to contribute to control of pH, (2) an organic wetting agent, and (3) a disodium dihydrogen ethylenediaminotetraacetrate complex with $NaI_3$ (EDTA—$NaI_3$) of high stability, which functions as a carrier for the $NaI_3$ as well as providing a softening action by reaction with lime and magnesia in solution, at varying degrees depending upon the pH of the solutions; were each found to be completely stable and yielded solutions of pH 4.0 when added to 6.25 gallons of water containing 540 parts per million $NaHCO_3$ and 360 parts per million $CaCl_2$:

A

| | Grams |
|---|---|
| EDTA—$NaI_3$ complex (U.S. Patent No. 2,698,819 of January 4, 1955, to Leo W. Ziemlak) | 14.5 |
| "Ultrawet" K Dense (trade name—surface active agent containing aromatic monosodium sulfonate) | 3.0 |
| Citric acid (anhydrous) | 21.35 |
| $NaH_2PO_4$ (anhydrous) | 3.55 |
| $NaIO_3 \cdot xNa_2SO_4$ complex | 1.56 |
| Total | 43.96 |

Titratable iodine, parts per million in 6.25 gallons of water=200–210.

B

| | Grams |
|---|---|
| EDTA—$NaI_3$ complex | 18.45 |
| "Ultrawet" K Dense | 3.0 |
| Citric acid (anhydrous) | 21.35 |
| $NaH_2PO_4$ (anhydrous) | 3.55 |
| $NaIO_3 \cdot xNa_2SO_4$ complex | 9.4 |
| Total | 55.75 |

Titratable iodine, parts per million in 6.25 gallons of water=200–220.

The sulfate-iodate complex was added to the foregoing formulations to react with the iodide ion in the $NaI_3$ complex and convert the same, as well as its own iodine, to the free element. With respect to formulation "B," it also functioned to provide a reserve of iodate to reoxidize any free iodine which might be reduced to iodide. The iodate-sulfate complex used in these formulations contained 12.6 percent iodine, compared to a theoretical content of 16.6 percent for $NaIO_3 \cdot 4Na_2SO_4$.

Example V

Formulations containing the following range of ingredients yielded solutions containing 96.6 parts per million of available iodine when added to one liter of water. The resulting solutions had pH values of approximately 2.7, a highly desirable value for high germicidal activity. The iodate-sulfate complex contained 12.66 percent iodine, equivalent to 19.75 percent $NaIO_3$ or a molar ratio of sulfate to iodate of 5.66.

| | Grams |
|---|---|
| $NaIO_3 \cdot xNa_2SO_4$ | 0.131 |
| KI | 0.370–0.174 |
| $Na_2SO_4$—$NaHSO_4$ (50–50 mixture) | 0.2 |
| Total | 0.701 |

Having thus described the subject matter of my invention, what it is desired to secure by Letters Patent is:

1. A composition capable of producing iodine on contact with water, comprising an alkali iodide, an alkali iodate and an acidifying agent, in relative proportions sufficient to react, on addition of water, to effect substantially complete conversion of said iodide and iodate to elemental iodine, said alkali iodate being present within said composition in the form of at least one double salt in which the alkali iodate is complexed with a salt component selected from the group consisting of alkali sulfates and alkali iodides.

2. A solid composition capable of producing iodine on contact with water, comprising sodium iodide, at least one sodium iodate-sodium sulfate double salt, and an acidifying agent, in substantially stoichiometric proportions for reaction, on addition of water, to effect substantially complete conversion of said sodium iodide and sodium iodate to elemental iodine.

3. The composition as claimed in claim 2, wherein said acidifying agent is sodium bisulfate.

4. The composition as claimed in claim 2, wherein said acidifying agent is an acid phosphate.

5. The composition as claimed in claim 2, wherein said acidifying agent is citric acid.

6. A solid composition capable of producing iodine on contact with water, comprising an alkali iodide, a mixture of the double salts $NaIO_3 \cdot 4Na_2SO_4$ and $NaIO_3 \cdot 3Na_2SO_4$, and and acidifying agent in substantially stoichiometric proportions for reaction, on addition of water, to effect complete conversion to elemental iodine of said alkali iodide and the sodium iodate components of said mixture of double salts.

7. A solid composition capable of producing iodine on contact with water, comprising an alkali iodide, a double salt of sodium iodate and sodium iodide, and an acidifying agent in substantially stoichiometric proportions for reaction, on addition of water, to effect complete conversion of the iodide and iodate to elemental iodine.

8. In the production of solid iodate-containing compositions of matter which are stable in the presence of organic components contained therein and capable of releasing free iodine when dissolved in an aqueous solvent medium, said solid compositions comprising an alkali iodide, an alkali iodate and an acid; the improvement that comprises admixing the alkali iodate component of said composition therein in the form of at least one double salt in which the alkali iodate is complexed with a salt component selected from the group consisting of alkali sulfates and alkali iodides.

9. A solid composition of matter capable of releasing free iodine when dissolved in an aqueous solvent medium that comprises sodium iodide, sodium iodate and citric acid in substantially stoichiometric proportons for reaction, on addition of water, to effect substantially complete conversion of said iodide and iodate to elemental iodine, said sodium iodate being present within said composition in the form of at least one double salt in which the sodium iodate is complexed with a salt component selected from the group consisting of sodium sulfate and sodium iodide.

10. A composition capable of releasing free iodine when dissolved in an aqueous solvent medium, comprising an alkali iodide, sodium iodate in the form of a double salt selected from the group consisting of $$NaIO_3 \cdot XNa_2SO_4$$

and $2NaIO_3 \cdot 3NaI \cdot XH_2O$, and an acidifying agent.

11. A composition capable of producing iodine upon contact with water and being of such stability as to insure safety in storage and handling when admixed with organic addition agents normally tending to promote instability of said composition in the presence of free sodium iodate, comprising an alkali iodide, sodium iodate, and an organic acidifying agent in substantially stoichiometric proportions for reaction, on addition of water, to effect substantially complete conversion of said iodate and iodide to elemental iodine, said sodium iodate being present within said composition in the form of at least one double salt in which the sodium iodate is complexed with a salt component selected from the group consisting of sodium sulfate and sodium iodide.

12. A composition capable of releasing iodine when dissolved in an aqueous solvent medium and being of such stability as to insure safety in storage and handling when admixed with organic addition agents normally tending to promote instability of said composition in the presence of free sodium iodate, comprising an alkali iodide, sodium iodate in the form of the double salt $NaIO_3 \cdot XNa_2SO_4$, and an acidifying agent.

13. A composition capable of releasing iodine when dissolved in an aqueous solvent medium and being of such stability as to insure safety in storage and handling when admixed with organic addition agents normally tending to promote instability of said composition in the presence of free sodium iodate, comprising an alkali iodide, sodium iodate in the form of the double salt $2NaIO_3 \cdot 3NaI \cdot XH_2O$, and an acidifying agent.

References Cited in the file of this patent
UNITED STATES PATENTS

| | | |
|---|---|---|
| 1,866,923 | Chandler | July 12, 1932 |
| 2,386,252 | Mendelsohn | Oct. 9, 1945 |

OTHER REFERENCES

Revue de Pharmacotechnie (France), 1922, pp. 515–524, p. 517 pert.